United States Patent [19]

Backof, Jr. et al.

[11] 4,216,463
[45] Aug. 5, 1980

[54] PROGRAMMABLE DIGITAL TONE DETECTOR

[75] Inventors: Charles A. Backof, Jr., Hoffman Estates; David S. Robins, Schaumburg, both of Ill.

[73] Assignee: Motorola, Inc., Schaumburg, Ill.

[21] Appl. No.: 932,734

[22] Filed: Aug. 10, 1978

[51] Int. Cl.$^2$ .................. H04Q 9/10; H03K 13/02; G06F 3/05; G01K 25/00
[52] U.S. Cl. ................ 340/171 R; 235/92 FQ; 324/78 D; 324/82; 328/134; 329/112; 364/724
[58] Field of Search .............. 340/171 R, 171 PF; 235/92 FQ; 329/112, 107; 328/134, 133, 167; 324/78 D, 82; 364/724, 728, 572; 333/70 R; 325/325, 351, 427, 490

[56] References Cited

U.S. PATENT DOCUMENTS

| | | | |
|---|---|---|---|
| 3,760,269 | 9/1973 | Beeman et al. | 324/78 D |
| 3,922,670 | 11/1975 | Shaw et al. | 324/78 D |
| 3,935,437 | 1/1976 | Schmitt et al. | 364/724 |
| 4,016,371 | 4/1977 | Hammad | 324/78 D |
| 4,019,149 | 4/1977 | Kustka et al. | 329/107 |
| 4,059,804 | 11/1977 | Agnus et al. | 324/78 D |
| 4,071,821 | 1/1978 | Harthill et al. | 364/728 |
| 4,125,866 | 11/1978 | Van Essen et al. | 364/724 |

OTHER PUBLICATIONS

A. D. Proudfoot, "Simple Multifrequency Tone Detector", *Electronics Letters*, Oct. 19, 1972, vol. 8, No. 21, pp. 524–525.

Primary Examiner—Donald J. Yusko
Attorney, Agent, or Firm—Sang Ki Lee; James W. Gillman

[57] ABSTRACT

A plurality of up/down counters are controlled by a programmed digital reference signal. The combination of a high select signal and a high input signal causes any one of the counters to increment (up) by one count while a combination of a high select signal and a low input signal causes any one of the counters to decrement (down) one count. A threshold detector signals on output when a specific combination of the counters reaches a predetermined combination count signifying correlation of the programmed reference with the input tone over a predetermined number of cycles. The phase of the input may be determined by noting which of the counters reaches the predetermined threshold.

10 Claims, 6 Drawing Figures

PROGRAMMABLE DIGITAL TONE DETECTOR

FIELD OF THE INVENTION

The invention relates to a programmable system for signaling the presence of a predetermined tone frequency over a predetermined number of cycles.

BACKGROUND OF THE INVENTION

The analog circuit of FIG. 1 represents one prior art solution to the problem of sensing one of a plurality of input tone frequencies in the presence of noise. It may be referred to as a maximum likelyhood quadrature tone detector for an unknown input phase. This prior art analog device suffers from lack of flexibility in that it must be designed for a single frequency and a predetermined bandwidth. It is also difficult to integrate a circuit of this type with other circuits of a using system.

Another prior art system which provides digital detection of incoming tones is described by A. D. Proudfoot, "Simple Multifrequency Tone Detector", *Electronics Letters*, Oct. 19, 1972, Vol. 8, No. 21, pp. 524–525. This system does not identify the phase of the incoming signal and it requires a complex digital reference signal for each incoming signal to be identified.

SUMMARY OF THE INVENTION

Solutions for these and other problems are provided for by the instant invention which is essentially a digital implementation of an integrate and dump quadrature detector. The frequency to be detected is programmable and can be anywhere between the limits of direct current and one-half the sampling frequency, specified as accurately as necessary for use in a system. The system bandwidth is also programmable and is independent of the frequency of the incoming signal to be detected. The filter implementation is compatible with both integrated circuits and microprocessor realizations.

Therefore, it is an object of the invention to provide a digital decoder with a programmable reference frequency requiring minimum digital storage capacity.

It is another object of the invention to provide a programmable bandwidth characteristic which is independent of the incoming signal frequency.

It is still another object of the invention to provide phase identification of the incoming signal within any needed accuracy range.

It is yet another object of the invention to provide a tone detector circuit which is easily integrated with the using system.

These and other objects of the invention will be more readily understood after reading the detailed description which follows together with due consideration of the drawings in which:

FIG. 1 illustrates, in block diagram form, a typical prior art system utilizing analog techniques, FIG. 2 represents a block diagram of a preferred embodiment of the invention, FIG. 3 represents a block diagram of a digital quadrature detector for integration or microprocessor implementation which may be emulated by the system of FIG. 2, FIG. 4 illustrates an embodiment of the invention similar to that of FIG. 2 wherein the limiter of FIG. 2 is replaced by an A/D converter and the counters of FIG. 2 are replaced by accumulators, FIG. 5 illustrates an implementation, in block diagram form, of weighted sine and cosine assignment for the Kth up/down counter or accumulator of FIG. 2 or 4, and FIG. 6 shows, in block diagram form, an integrate-and-dump system wherein the timing is segmented into a plurality of portions. It may replace one of the counters of FIG. 2.

DETAILED DESCRIPTION OF THE INVENTION

Figure 1:
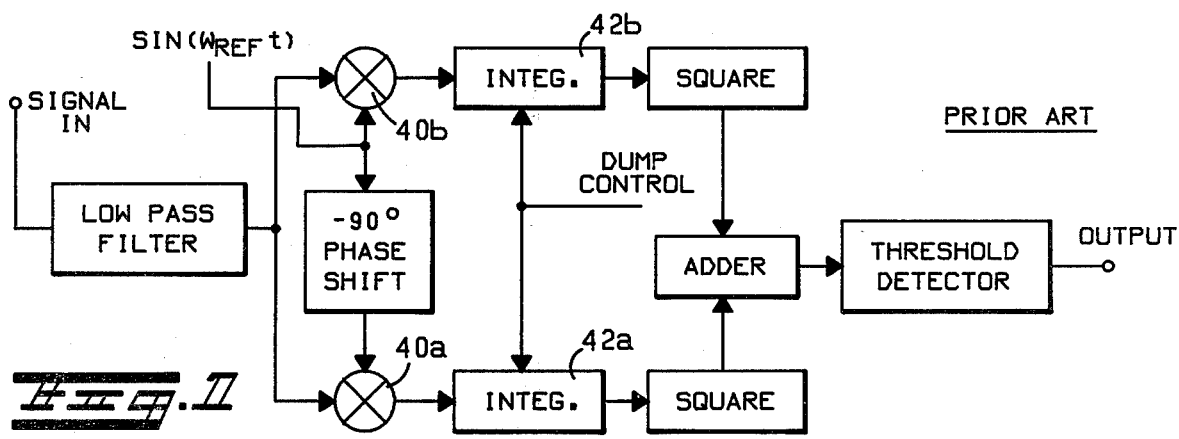
Figure 2:
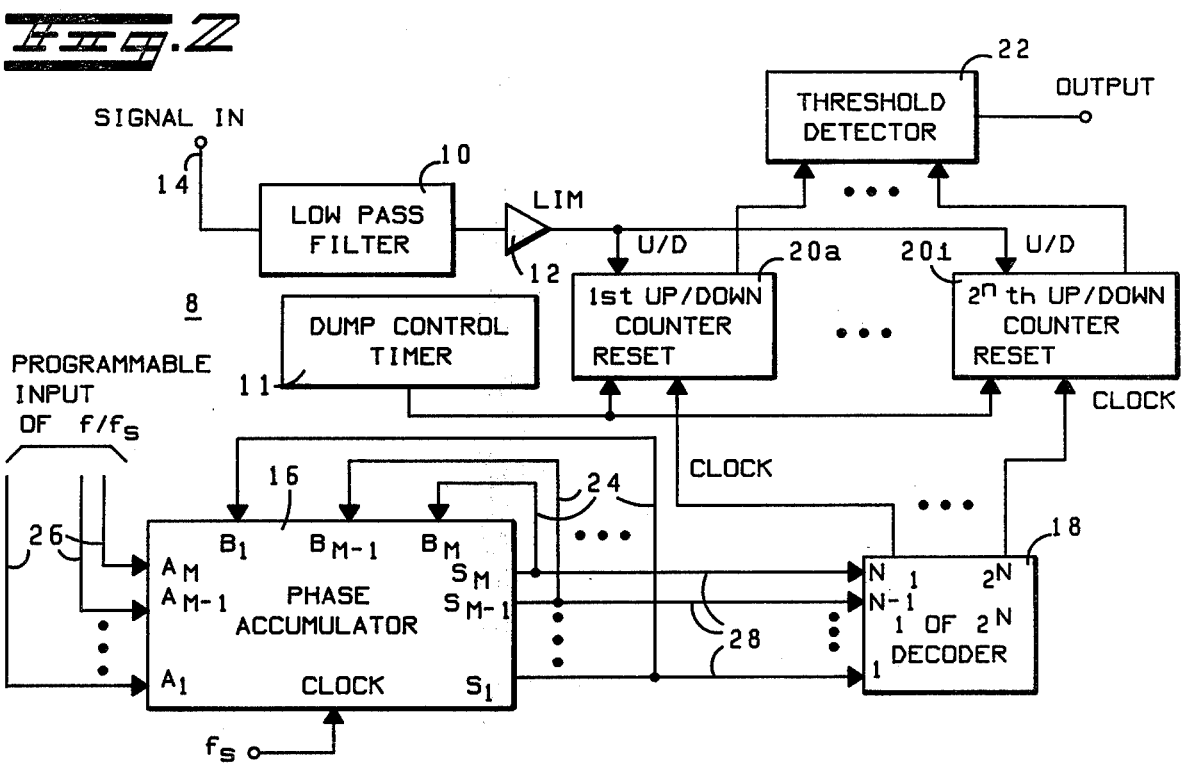
Figure 3:
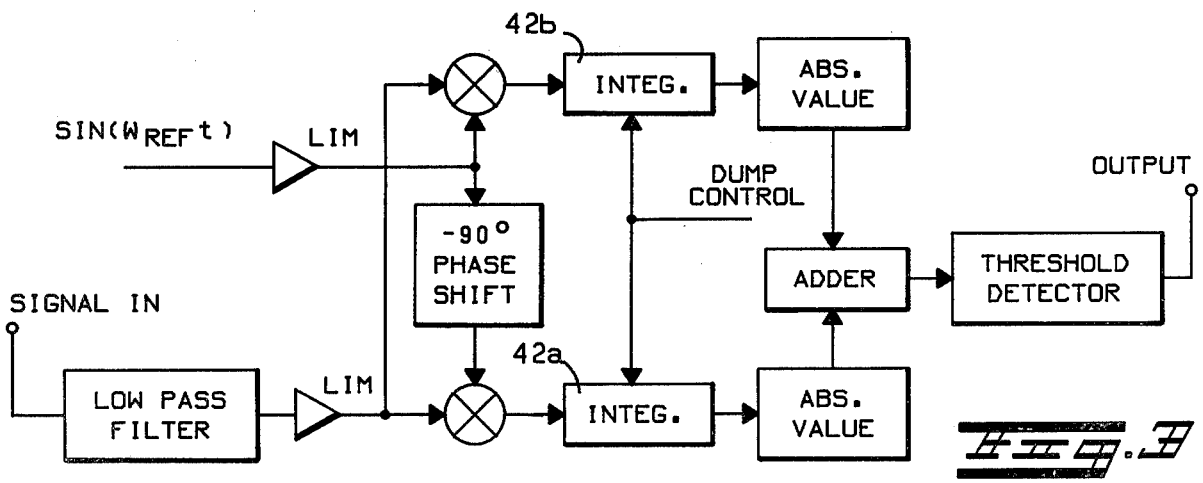

A block diagram of digital tone detector 8 is shown in FIG. 2. The detector consists of low-pass filter 10 and limiter 12 for operation on input signal 14, phase accumulator 16, 1 of $2^n$ decoder 18, $2^n$ up/down counters 20 (20a ... 20i), and threshold detector 22. (FIG. 1 shows a prior art analog quadrature detector which may be used for comparison.) Digital detector 8 operates by generating a digital local reference which has the same frequency as the tone to be detected. The input signal is low-pass filtered, limited, and sampled. The sample, a 1 or $-1$, is then accumulated in one of $2^n$ counters 20 specified by the n most significant bits of the local reference phase at the sampling instant. The integrate-and-dump cycle consists of clearing all counters, accumulating a preset number of samples corresponding to a predetermined observation window, and then applying a threshold decision. In the following paragraphs, the local reference generator, decoder and counter operation, and threshold detector are discussed in detail.

Phase accumulator 16 comprises a multibit binary adder and register (not shown in detail) which are used to generate local reference signal 28. Output 24 of the adder is also connected to the register input; the output of the register is connected back to one of the inputs to the adder. The other input to the adder is programmable frequency input 26. For detecting a frequency f, programmable input 26 is set to the binary fraction corresponding to a ratio of f to $f_s$, the sampling frequency. This fraction $f/f_s$, indicates the phase change that occurs in the local reference in the interval between sampling clock pulses. The fraction $f/f_s$ is added to the accumulator at each sampling instant using modulo one arithmetic. Therefore, on overflow of the adder, the ones are dropped, leaving only the fractional part. The value in the accumulator represents a binary fraction between 0 and 1, corresponding to a phase angle of local reference 28 between 0° and 360°. The accumulator has m bits of precision, and therefore can specify the phase of the reference to $2^{-m}$ of a cycle. For m=16 and an 8 KHz sampling frequency, the corresponding frequency accuracy is $8000 \times 2^{-16}$, or 0.122 Hz. Thus, for this case, the local reference can be any frequency between DC and 4 KHz, to the nearest 0.122 Hz.

The decoder and counters used in digital tone detector 8 correspond to multipliers 40 and integrators 42 of the quadrature detector (shown in FIG. 1). 1 of $2^n$ decoder 18 uses the n most significant bits of phase accumulator 16 to divide one reference cycle into $2^n$ equal parts. Although n can be any number less than or equal to m, the total number of bits, only the n=2 case will be discussed here for simplicity. The implications of choosing larger values of n are discussed, infra.

There are four ($2^n$) up/down counters 20 (only two shown in FIG. 2; 20a, 20i), one for each output of the 1-of-4 decoder. The output of decoder 18 indicates which of the four is to be counted after any sample clock; the output of limiter 12 indicates the direction of the count. A limiter 12 output "1" causes the selected counter to be incremented, while a "−1" causes it to be decremented. Each counter 20 is therefore accumulating the input samples for its quadrant of the reference cycle; first counter 20a accumulates the input signal when the reference phase is between 0 and 0.25, corresponding to 0° and 90°; the second, 0.25 and 0.5, corresponding to 90° to 180°; etc. In this way, if input signal 14 to detector 8 has the same frequency as local reference signal 28, the samples accumulated in each counter 20 will be in phase to within ±45°, and the counts in accumulator 16 will increase in magnitude with continued sampling. If input signal 14 is not the same frequency as reference 28, or is noisy, the samples in each counter 20 will not be in phase, and the samples will tend to cancel, causing the contents of the counters to remain near zero.

The operating cycle of detector 8 has three parts. First, counters 20 are reset by dump control timer 11. Next, samples are accumulated in counters 20, as described above. The number of samples accumulated determines the observation window, corresponding to integrate portions 42 of the integrate-and-dump quadrature detector (FIG. 1). Finally, the threshold decision is applied to the accumulated samples in counters 20.

The threshold rule must examine all four counters 20, and determine whether or not input signal 14 was present during the observation window. The rule must be phase independent, since the phase of the detected signal may not match the reference. Labeling the accumulated samples in counters 20 as $M_1$, $M_2$, $M_3$, and $M_4$, the detection rule is to compare the maximum of the magnitudes of $|M_1-M_3|$ and $|M_2-M_4|$ to a predetermined threshold T. That is, if the maximum of $|M_1-M_3|$ or $|M_2-M_4|>T$, the tone is present; otherwise it is absent.

Following is an operating example of tone detector 8 for a particular frequency and a discussion of the extraneous responses due to limiting and sampling and the effect of larger values of n, i.e.; more than four accumulating registers.

Assume a frequency f of 905 Hz is to be detected. The sampling frequency $f_s$ is 8 KHz and the bandwidth of the detector is 30 Hz. From the previous discussion, the input to phase accumulator 16 must be the binary fraction given by $f/f_s$. This fraction is 0.11875, or in binary 0.0001 1110 0110 0110. This phase increment $f/f_s$ is added to phase accumulator 16 at each sampling of input 26. In order to set the bandwidth the integrate-and-dump interval, controlled by timer 11, is chosen as 32 msec. (which is the reciprocal of the bandwidth), which corresponds to 256 samples of the input signal. These 256 samples are then accumulated in counters 20; each sample of the input is directed to its proper counter 20 by decoding the two most significant bits of phase accumulator 16. Since 256 samples are taken, approximately 64 will be directed to each counter 20. The exact number depends on the initial value of phase accumulator 16.

The integrate-and-dump cycle begins by clearing all counters 20 with timer 11 and then accumulating 256 samples as described above. At the end of the sampling interval the criterion is calculated and the threshold test is applied. The criterion is the maximum of $|M_1-M_3|$ or $|M_2-M_4|$ where $M_1$ through $M_4$ represent the values in counters 20.

Extraneous responses arise due to the filtering and limiting of the input signal. Specifically, the response at f/3 is down by only 9.5 dB (⅓) and is due entirely to the hard-limiting of the original input signal. f/5, f/7, f/9, etc. responses also arise due to that limiter. A 3f term arises due to the effective hard-limiting of the local reference which comes about by using 4 counters to accumulate the input samples. There are 5f, 7f, 9f, etc. responses due to the same limiting operation and their responses, due to sampling, are folded around the $f_s/2$ point. Other responses, such as $f_s/3\pm f/3$, arise due to a mixing action that occurs between the input sampling frequency and the harmonics of the input tone produced by the input limiter.

Figure 4:
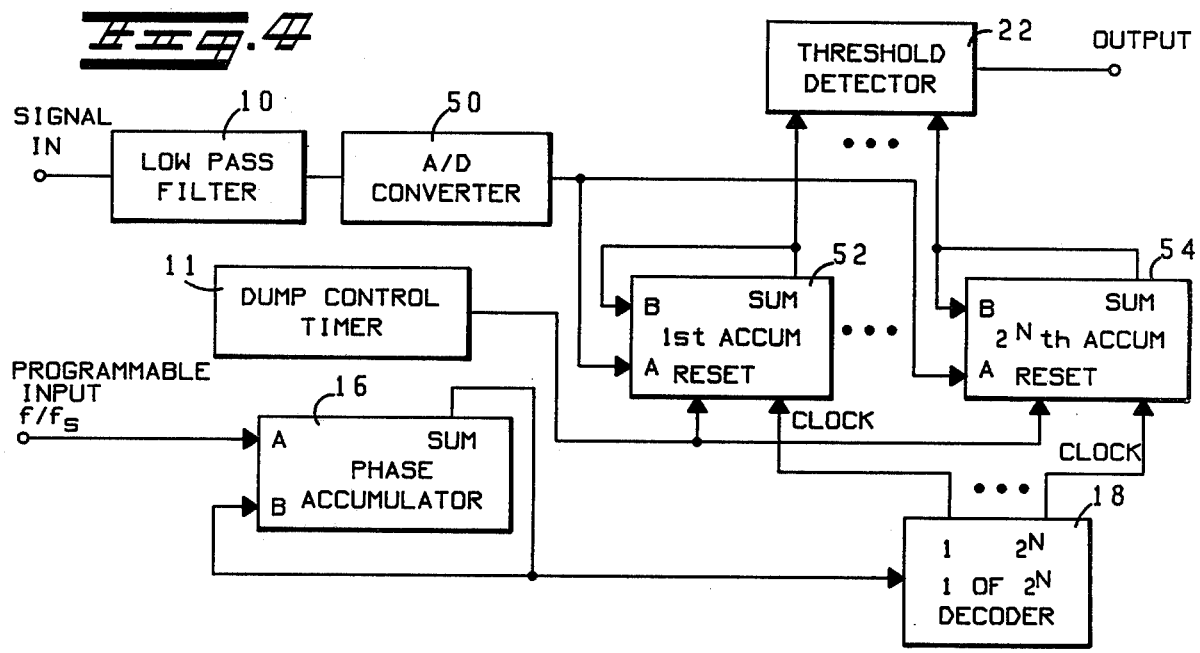
Figure 5:
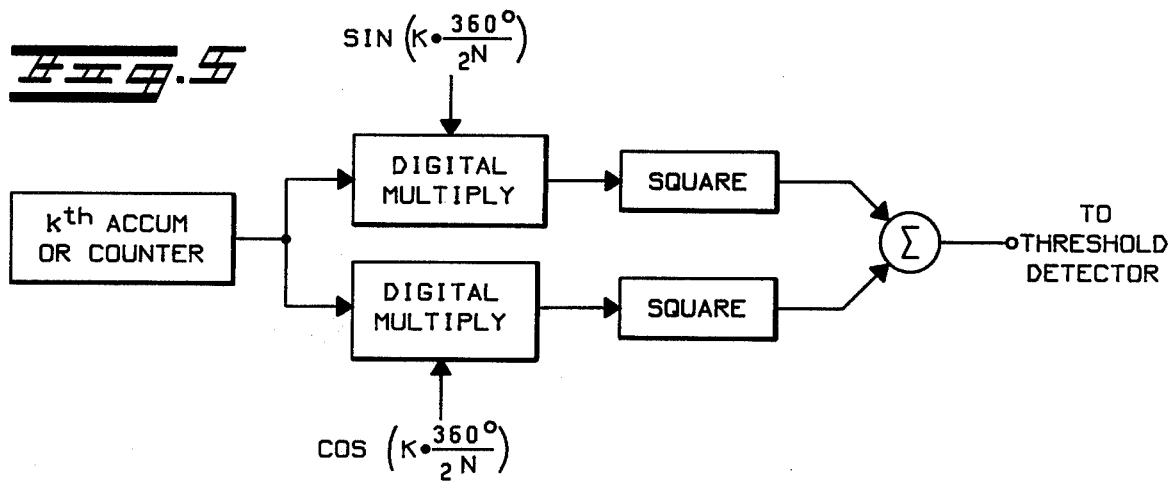

The detector discussed in the previous discussion is a quadrature integrate-and-dump detector using a limited input signal and a limited local reference. The extraneous signals are caused by these limiters. (Refer to FIG. 4). Because of the unique implementation of the quadrature detector the input limiter can be replaced by analog-to-digital (A/D) converter 50 without requiring two digital multiplications for each sample. In this case, the up/down counters of FIG. 2 are replaced by accumulators 52, 54 and the digital value from A/D converter 50 is added to the selected accumulator corresponding to the current reference phase. The local reference limiting that is created by the four counter approach could be eliminated by using more than four counters. In particular, as the number of counters increases to 8, 16, etc., the harmonics of the local reference responses may be decreased to any arbitrary level. This may be accomplished by assigning to each accumulator or counter a sine and cosine value proportional to the sine and cosine value of its particular phase, as shown in FIG. 5. The detection rule would be changed to multiply the contents of each accumulator by its corresponding sine and cosine values, and then emulate the square law detector as shown in FIG. 1. The advantage of the system of FIG. 5 over classical maximum likelihood detectors is that multiplication is performed only once at the end of each sample period rather than once for each input sample. Thus, the circuit may be modified if required to emulate the classical maximum likelihood integrate-and-dump quadrature detector.

Figure 6:
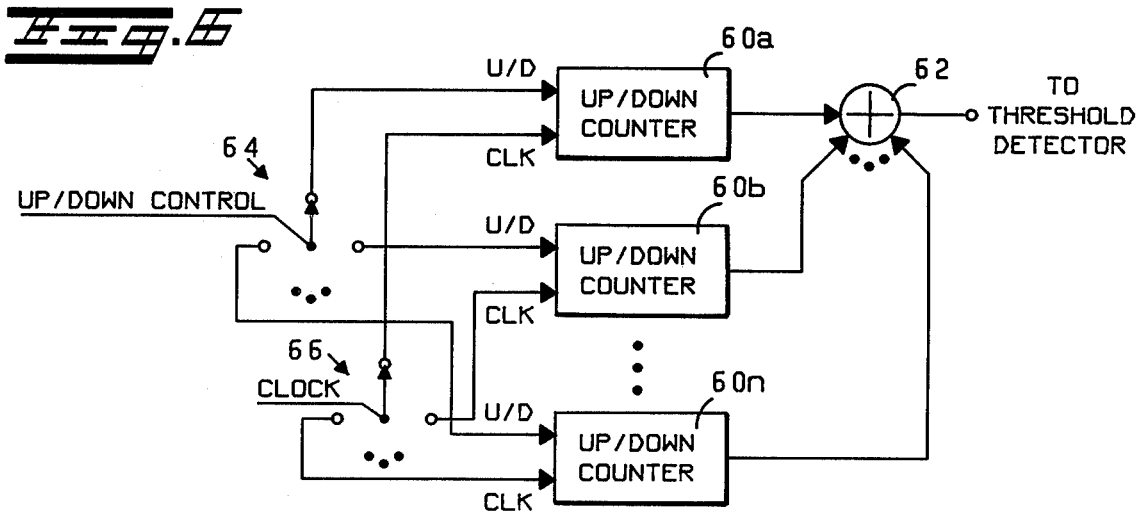

This integrate-and-dump detector technique can be used to implement a pseudo-continuous detector for a system in which the start of the tone is unknown. An example of this implementation is shown in FIG. 6. The subsystem of FIG. 6 may be substituted for each of the counters 20 of FIG. 2 to implement such a pseudo-continuous detector. For example, using the previous example of an integration time of 32 milliseconds, this time can be broken into eight 4 millisecond integrate-and-dump segments. Counters 60 of FIG. 6 are used to accumulate the segmented counts. Up/down control switch 64 and clock control switch 66 are controlled by a control signal (not shown) which is suitably synchronized with dump control timer 11 of FIG. 2. The counter values for the last eight events may be summed together in adder 62. The proper threshold criteria may then be applied. This implementation leads to a detector with the same bandwidth as in the embodiment of the invention of FIG. 2, but produces a detector output every 4 milliseconds rather than every 32 milliseconds.

In summary, a unique implementation of a quadrature detector has been presented. It uses a more efficient detection algorithm than a classical detector or other digital filter detectors, and has the advantage of being fully programmable and easily implemented in a microprocessor or integrated circuit.

Various other modifications and changes may be made to the present invention from the principles of the invention as described above without departing from the spirit or scope thereof, as encompassed in the accompanying claims.

What is claimed is:

1. Apparatus for detecting at least one of a plurality of tones comprising:

programmable phase accumulator means for generating a digital reference tone representing the phase of the digital reference tone having a predetermined number of output bits;

decoder means for accepting said predetermined number of output bits and for producing output code bits in response thereto;

a plurality of accumulating means, each of said accumulating means being selected by a corresponding one of said output code bits;

input signal means for filtering and digitizing each of the plurality of tones, each of the plurality of tones having a positive phase and a negative phase, said input signal means having an output to each of said plurality of accumulator means, each said accumulator means being responsive to a simultaneous combination of one of said output code bits and a positive signal input phase; and threshold detector means for determining when the absolute value of the difference between a predetermined first pair of said plurality of accumulator means is different by a predetermined count from the absolute value of the difference between a predetermined second pair of said plurality of accumulator means, said threshold detector means having an output signal on at least one output terminal thereof, said output signal being responsive to said predetermined count.

2. The apparatus according to claim 1 wherein said accumulator means comprise at least one up/down counter, said at least one up/down counter being responsive to a simultaneous combination of one of said output code bits and to said positive input signal phase to count in an up direction, said at least one up/down counter being responsive to a simultaneous combination of one of said output code bits and to said negative input signal phase to count in a down direction.

3. The apparatus according to claim 1 wherein said digitizing means comprises an analog to digital converter.

4. The apparatus according to claim 1 wherein said digitizing means comprises a limiter.

5. The apparatus according to claim 1 wherein each of said plurality of accumulator means comprises a plurality of up/down counters, each of said plurality of up/down counters being selected in a predetermined, timed sequence by an up/down control switch, said up/down control switch being synchronously driven from a dump control timer.

6. The apparatus according to claim 1 wherein each of said plurality of accumulator means is assigned a sine and cosine value, said sine and cosine value being proportional to a sine and cosine value of a particular predetermined phase.

7. The apparatus according to claim 1 wherein said threshold detector means is provided with a plurality of output terminals, said threshold detector output signal appearing on one of said plurality of output terminals corresponding to one of said plurality of up/down counters which reaches said predetermined count, said output signal being digitally responsive to one of a plurality of phase ranges of said input signal.

8. Apparatus, according to claim 1, wherein microprocessor means is used in place of and programmed to perform the functions of said programmable phase accumulator means, decoder means, a plurality of accumulating means, and threshold detector means.

9. Apparatus for detecting at least one of a plurality of tones comprising:

programmable phase accumulator means for generating a digital reference tone representing the phase of the digital reference tone having a predetermined number of output bits;

decoder means for accepting said predetermined number of output bits and for producing output code bits in response thereto;

a plurality of up/down counter means, each of said plurality of up/down counter means being selected by a corresponding one of said output code bits;

input signal means for filtering and limiting each of the plurality of tones, each of said plurality of tones having a positive phase and a negative phase, said input signal means having an output to each of said plurality of up/down counters, each of said up/down counters being responsive to a combination of one of said output code bits and a positive input signal phase to incrementally count up and to one of said output code bits and a negative input signal phase to decrementally count down; and threshold detector means for determining when one of said plurality of up/down counters reaches a predetermined count, said threshold detector having an output signal on at least one output terminal thereof being responsive to said predetermined count.

10. Apparatus, according to claim 9, wherein microprocessor means is used in place of and programmed to perform the functions of programmable phase accumulator means, a plurality of up/down counter means, and threshold detector means.

* * * * *

UNITED STATES PATENT AND TRADEMARK OFFICE
CERTIFICATE OF CORRECTION

PATENT NO. : 4,216,463
DATED : August 5, 1980
INVENTOR(S) : CHARLES A. BACKOF, JR. and DAVID S. ROBINS It is certified that error appears in the above-identified patent and that said Letters Patent are hereby corrected as shown below:

In the Abstract at line 7, "on" should be --an--.

Col. 1, line 13, "likelyhood" should be --likelihood--.

Col. 5, lines 10 and 11, delete "representing the phase of the digital reference tone", and insert the same after "bits" at line 12.

Col. 6, lines 25 and 26, delete "representing the phase of the digital reference tone", and insert the same after "bits" at line 27.

Signed and Sealed this

Ninth Day of December 1980

[SEAL]

Attest:

SIDNEY A. DIAMOND

Attesting Officer

Commissioner of Patents and Trademarks